United States Patent [19]
DeBarber et al.

[11] Patent Number: 5,793,652
[45] Date of Patent: Aug. 11, 1998

[54] DIMENSIONAL WEIGHING APPARATUS

[75] Inventors: Christopher DeBarber, Woodbury; Gerald C. Freeman, Norwalk, both of Conn.

[73] Assignee: Pitney Bowes Inc., Stamford, Conn.

[21] Appl. No.: 775,675

[22] Filed: Dec. 31, 1996

[51] Int. Cl.⁶ .................................................. G01B 7/00
[52] U.S. Cl. ...................... 364/567; 364/560; 705/401; 705/407
[58] Field of Search ........................... 364/560–564, 364/567, 568, 464.1, 464.11, 464.12, 464.16, 464.17, 464.21, 464.24; 705/401, 402, 406, 407, 414

[56] References Cited

U.S. PATENT DOCUMENTS

| | | | |
|---|---|---|---|
| 2,689,082 | 9/1954 | Kolisch | 235/61 |
| 4,268,967 | 5/1981 | Brana et al. | 33/1 V |
| 4,270,173 | 5/1981 | Suttler | 364/560 |
| 5,121,328 | 6/1992 | Sakai et al. | 364/464.03 |
| 5,528,517 | 6/1996 | Loken | 364/560 |

*Primary Examiner*—James P. Trammell
*Attorney, Agent, or Firm*—Robert H. Whisker; Melvin J. Scolnick

[57] ABSTRACT

A dimensional weighing apparatus is disclosed which has a weighing scale for determining the actual weight of a carton placed thereon, and associated therewith is a measuring frame having movable carton contact means for measuring the linear distance of the three axes of a carton positioned on the scale necessary to determine the volume of the carton. A computer processing means determines firstly whether the actual volume of the carton is less or greater than a predetermined threshold volume, and if greater, calculates a dimensional weight of the carton and compares the dimensional weight of the carton with the actual weight to determine which weight is the larger, and sends a signal indicative of the larger weight to a shipping system which calculates a realistic shipping charge for the carton based on the weight determined by the dimensional weighing apparatus to be the larger of the two weights.

7 Claims, 7 Drawing Sheets

DIMENSIONAL WEIGHING APPARATUS

RELATED APPLICATIONS

Reference is made to application Ser. No. 08/775,850, entitled APPARATUS AND METHOD FOR DIMENSIONAL WEIGHING UTILIZING A LASER SCANNER, assigned to the assignee of this application and filed on even date herewith.

Reference is made to application Ser. No. 08/775,672, entitled METHOD FOR DIMENSIONAL WEIGHING UTILIZING POINT DETERMINATION, assigned to the assignee of this application and filed on even date herewith.

Reference is made to application Ser. No. 08/775,673, entitled METHOD FOR DIMENSIONAL WEIGHING UTILIZING SPACED LINE PROJECTION, assigned to the assignee of this application and filed on even date herewith.

Reference is made to application Ser. No. 08/775,671, entitled METHOD FOR DIMENSIONAL WEIGHING WITH OPTICS, assigned to the assignee of this application and filed on even date herewith.

Reference is made to application Ser. No. 08/775,549, entitled LOW COST DIMENSIONAL DETERMINING SYSTEM, assigned to the assignee of this application and filed on even date herewith.

Reference is made to application Ser. No. 08/775,851, entitled COARSE VOLUME MEASUREMENT WITH INTERLOCK, assigned to the assignee of this application and filed on even date herewith.

Reference is made to application Ser. No. 08/775,550, entitled DIMENSIONAL WEIGHING UTILIZING A FOLLOWING ARM MECHANISM, assigned to the assignee of this application and filed on even date herewith.

Reference is made to application Ser. No. 08/775,214, entitled DIMENSIONAL WEIGHING UTILIZING A LINEAR DISPLACEMENT TRANSDUCER, assigned to the assignee of this application and filed on even date herewith.

Reference is made to application Ser. No. 08/775,213, entitled APPARATUS AND METHOD FOR DIMENSIONAL WEIGHING UTILIZING A ROTATING SENSOR, assigned to the assignee of this application and filed on even date herewith.

Reference is made to application Ser. No. 08/775,674, entitled APPARATUS AND METHOD FOR DIMENSIONAL WEIGHING UTILIZING A MIRROR AND/OR PRISM, assigned to the assignee of this application and filed on even date herewith.

BACKGROUND OF THE INVENTION

The present invention relates generally to the concept of dimensional weighing to determine the charge required by a carrier for transporting a package or parcel, and more particularly to a dimensional weighing system suitable for use by a variety of shippers and carriers to determine accurate freight charges for packages or parcels that are considerably oversized in comparison to their actual weight.

A detailed description of the background and development of the concept of dimensional weighing, as well as the significant problems and disadvantages of prior art dimensional weighing systems, is set forth in the Background of the Invention portion of the above referenced specification entitled LOW COST DIMENSIONAL DETERMINING SYSTEM (application Ser. No. 08/775,549), which is incorporated herein by reference.

Briefly, the invention disclosed and claimed in that application is a dimensional weighing system in which a measuring frame has three measuring arms extending from a common juncture along the three axes of a package or parcel which must be measured to determine the volume of the parcel positioned adjacent the measuring arms with a corner of the parcel adjacent to the common juncture of the measuring arms. A plurality of optical emitters, such as LEDs, are evenly positioned along the length of the measuring arms, and either one or three optical sensors, depending on the particular embodiment of the invention, are positioned such that the sensor(s) respond to all emitters on the measuring arms that are not obscured by the parcel. By suitable electronic components, a micro computer ascertains the length of each of the dimensions of the package or parcel and calculates its volume. The computer then compares that volume with a predetermined threshold volume stored in a memory, so as to determine, firstly, whether the volume of the parcel is less than the predetermined threshold volume so that it can be shipped at a shipping charge based on the actual weight of the carton as determined by a suitable weighing scale, or is larger than the predetermined threshold volume and may therefore require that a dimensional weight be calculated on which a shipping charge is based. If the latter situation prevails, the computer then compares the dimensional weight of the carton with the actual weight to determine which is larger to ensure than the shipping charge is based on the proper weight.

Two significant problems became evident with the dimensional weighing system disclosed and claimed in that application. One was that it was sometimes difficult or awkward to place a carton on the scale platform because of interference with the sensor support, which generally occupied space within or closely adjacent to the space occupied by cartons on the scale, especially large cartons. In view of the large number of packages and parcels that typically could be handled by a large shipper or carrier, anything that hindered rapid and accurate placement of cartons on the scale represented a serious problem.

Another problem was that the apparatus was relatively expensive in that a large number of emitters were utilized to provide a high degree of resolution of the optical sensing system in order to achieve a high degree of accuracy in the calculation of the volume of cartons. Thus, the dimensional weighing apparatus was not cost effective for medium or low volume shippers or carriers, with the result that they often either over or under estimated and charged, as the case may be, either themselves or their customers.

Another of the above cross-referenced applications (COARSE VOLUME MEASUREMENT WITH INTERLOCK, application Ser. No. 08/775,851), sought to eliminate these disadvantages by providing a dimensional weighing apparatus having many similarities to the apparatus disclosed in the first application, but with two significant differences. The optical sensing system was modified to provide a plurality of combined emitter/sensor units spaced along the measuring arms, each unit having an emitter and a sensor disposed immediately adjacent to each other so that light from the emitter would be reflected back to the sensor by the side of a carton placed on the scale platform. The number of emitter/sensor units so activated by the side of a carton could enable the computer to calculate the linear dimensions of a carton. Another significant change was that the number of emitter/sensor units was greatly reduced from that in the previous apparatus with a consequent loss of resolution and accuracy, but the computer processing system could provide a sufficiently acceptable estimate of the volume of cartons that the apparatus could be utilized with reasonable accuracy for the majority of cartons encountered in the ordinary course of many shipping situations, thereby greatly reducing the cost of the apparatus. The computer processing system could also provide the operator with a visual indication of whether the volume of a particular carton was above or below a predetermined threshold volume, above which the operator could manually measure the carton and determine an accurate shipping weight, and below which he could use the actual weight of the carton as determined by the weighing scale and still be assured of obtaining a realistic shipping charge for the carton.

Thus, the apparatus of this application was easier to use in that the operator was able to place cartons on the scale platform without interference from any supporting structure, thereby considerably increasing the speed at which cartons could be disposed on and removed from the scale. Also, it was considerably more cost effective for medium and low volume shippers and carriers because the reduction in the number of emitters utilized greatly reduced the cost of the optical sensing system, even though additional sensors were utilized because they were less expensive than those used in the apparatus of the first application because they were much smaller and did not have a wide included angle of vision. These advantages, however, were obtained only at the cost of considerably less resolution of the optical sensing system and consequent less accuracy in the calculation of the carton volume.

Thus, there is a need for a dimensional weighing apparatus which avoids the disadvantages of the dimensional weighing apparatus disclosed in both of the above cross-referenced applications, in that it is sufficiently economical to be cost effective for small to medium size carriers and shippers and yet is easy to use with a high throughput rate and is highly accurate in measuring cartons and determining the volume thereof.

SUMMARY OF THE INVENTION

The foregoing shortcomings and disadvantages of the dimensional weighing apparatus disclosed and claimed in the above cross-referenced applications are largely obviated, if not entirely eliminated, by the dimensional weighing apparatus of the present invention. More specifically, the apparatus of the present invention provides a mechanical measuring system which very precisely measures the linear distance of the length, width and height of cartons properly positioned relative to the measuring system with neither expensive optical devices for performing the measuring function nor with any supporting structure interfering with the rapid and accurate placement of carton in proper position in association with the measuring system.

In its broader aspects, the dimensional weighing apparatus of the present invention is adapted for use with a shipping system which determines an appropriate shipping charge for packages and parcels based, among other factors, on an appropriate shipping weight as determined by said dimensional weighing apparatus. Within this environment, the dimensional weighing apparatus comprises means defining a supporting surface, a weighing scale mounted on the supporting surface and having a platform on which cartons are placed for determining the actual weight of the cartons, a measuring frame operatively associated with the supporting surface, and movable means operatively associated with the measuring frame for contacting adjacent surfaces of a carton placed on the platform for measuring the linear distance of the length, width and height of the carton. There is a computer processing means responsive to operation of the weighing scale and the measuring means for determining a shipping weight of the carton by calculating the dimensional weight thereof and comparing the dimensional weight with the actual weight to determine which of these weights is the larger, whereby the dimensional weighing apparatus determines the appropriate shipping weight on which the shipping system determines an appropriate shipping charge.

In some of its more limited aspects, the weighing scale includes means defining a reference point for cartons disposed on the platform of the weighing scale for positioning cartons in a predetermined location on the platform relative to the measuring frame such that the surfaces of the cartons adjacent the measuring frame are disposed in spaced relationship therewith. The means defining the reference point comprises guide means mounted on the platform in spaced parallel relationship with the measuring arms for ensuring that the surfaces of cartons disposed on the platform in the predetermined location are disposed in evenly spaced parallel relationship with the measuring arms.

The measuring frame includes a plurality of elongate measuring arms extending from a juncture of the measuring arms disposed adjacent to the reference point along the two horizontal axes of cartons and the vertical axis thereof, the juncture of said measuring arms being disposed in closely spaced relationship with the reference point. The means for measuring the linear distance of the length, width and height of a carton disposed on the platform comprises contact means movably mounted on each of said measuring arms for movement there along for determining the extent to which each of said adjacent surfaces of a carton disposed on said platform in said predetermined location extends along the adjacent measuring arm. The movable contact means further includes means for moving the contact members along the measuring arms between a home position adjacent the outer free ends of the measuring arms and a stop position as determined by the point of contact of the contact members with the surface of a carton adjacent said measuring arms, and means for determining the extent of movement of the contact members between the home positions and the stop positions. Preferably, the means for determining the extent of movement of the contact members comprises an optical encoder responsive to movement of said contact members for counting successive increments of movement thereof.

The computer processing means for determining the shipping weight of a carton includes processing means for determining whether or not the volume of a carton exceeds a predetermined threshold volume below which the processing means determines a shipping weight based on the weight of the carton as determined by the weighing scale, and at or above which the processing means calculates a shipping weight based on the volume of the carton independent of the weight thereof as determined by the weighing scale. To accomplish this, the processing means also includes a memory storage means for storing the predetermined threshold volume, memory storage means for storing the individual linear dimensions of the length, width and height of a carton disposed on the platform, means for calculating the volume of the carton based on the linear dimensions, and means for comparing the calculated volume of the carton with the predetermined threshold volume to determine which is the larger, so that the shipping system can determine an appropriate shipping charge for the carton based on that larger weight.

The processing means further includes a memory storage means for storing a dimensional weight constant in terms of cubic units per unit of weight, means for calculating a dimensional weight by dividing the actual volume of the carton by the dimensional weight constant, and means for comparing the actual weight with the calculated dimensional weight to determine which is the larger, which is the shipping weight on which the shipping system determines a shipping charge.

Having briefly described the general nature of the present invention, it is a principal object thereof to provide a dimensional weighing apparatus which has advantageous features of accuracy, simplicity, convenience and speed of operation, and economy of manufacture not heretofore encountered in prior art dimensional weighing apparatus.

Another object of the present invention is to provide a dimensional weighing apparatus in which a measuring apparatus determines the linear measurements of the length, width and height of the carton without the carton contacting any portion of a measuring frame of the dimensional weighing apparatus which could adversely affect the actual weight thereof.

Still another object of the present invention is to provide a dimensional weighing apparatus in which a measuring apparatus determines the linear measurements of the length, width and height of the carton without the use of a number of expensive optical sensing devices, but rather by utilizing relatively inexpensive mechanical measuring devices which provide highly accurate measurements.

It is another object of the present invention to provide a dimensional weighing apparatus in which there is no structure that would interfere with the rapid and accurate placement of cartons in proper position relative to the measuring apparatus.

These and other objects and features of the dimensional weighing apparatus of the present invention will be more apparent from a consideration of the following detailed description of presently preferred embodiments of the invention, when considered in conjunction with the accompanying drawings.

DETAILED DESCRIPTION OF THE PREFERRED EMBODIMENT

Figure 1:
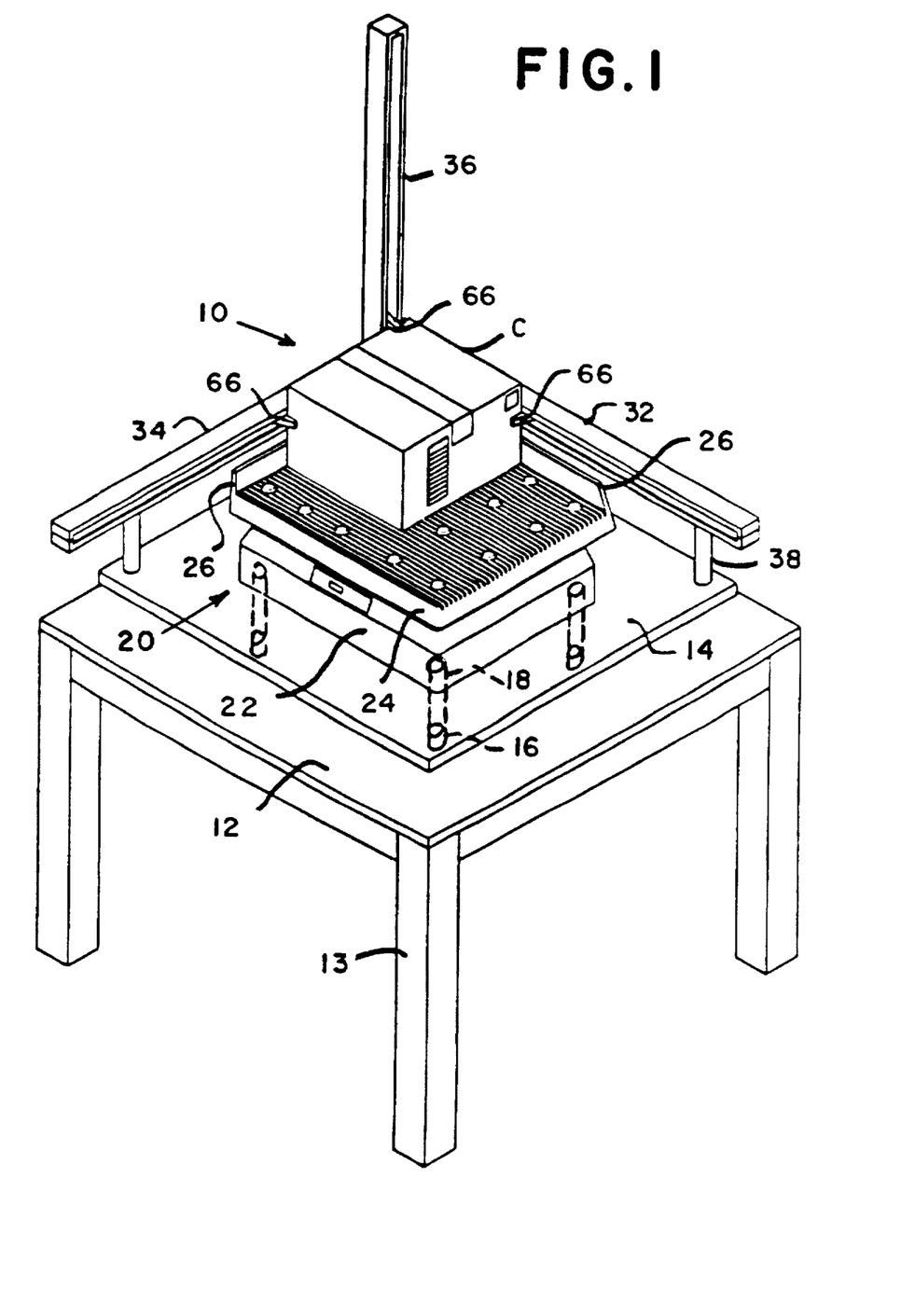
FIG. 1 is a perspective view of the dimensional weighing apparatus embodying the principles of the present invention, illustrating the relationship between a weighing scale with a carton thereon and a dimensional measuring frame.

Referring now to the drawings, and particularly to FIG. 1 thereof, the dimensional weighing apparatus of the present invention is indicated generally by the reference numeral 10.

The apparatus 10 is mounted on and supported by any suitable horizontal surface, such as the surface 12 which is supported by the legs 13. It will, of course, be apparent, that any suitable support, such as a work bench, counter top, desk, etc., may be utilized. The apparatus 10 includes a base 14 which is adapted to rest on the surface 12 or other supporting surface, the base 14 having registration apertures 16 which receive registration feet 18 mounted on the bottom wall of a weighing scale, indicated generally by the reference numeral 20.

Figure 2:
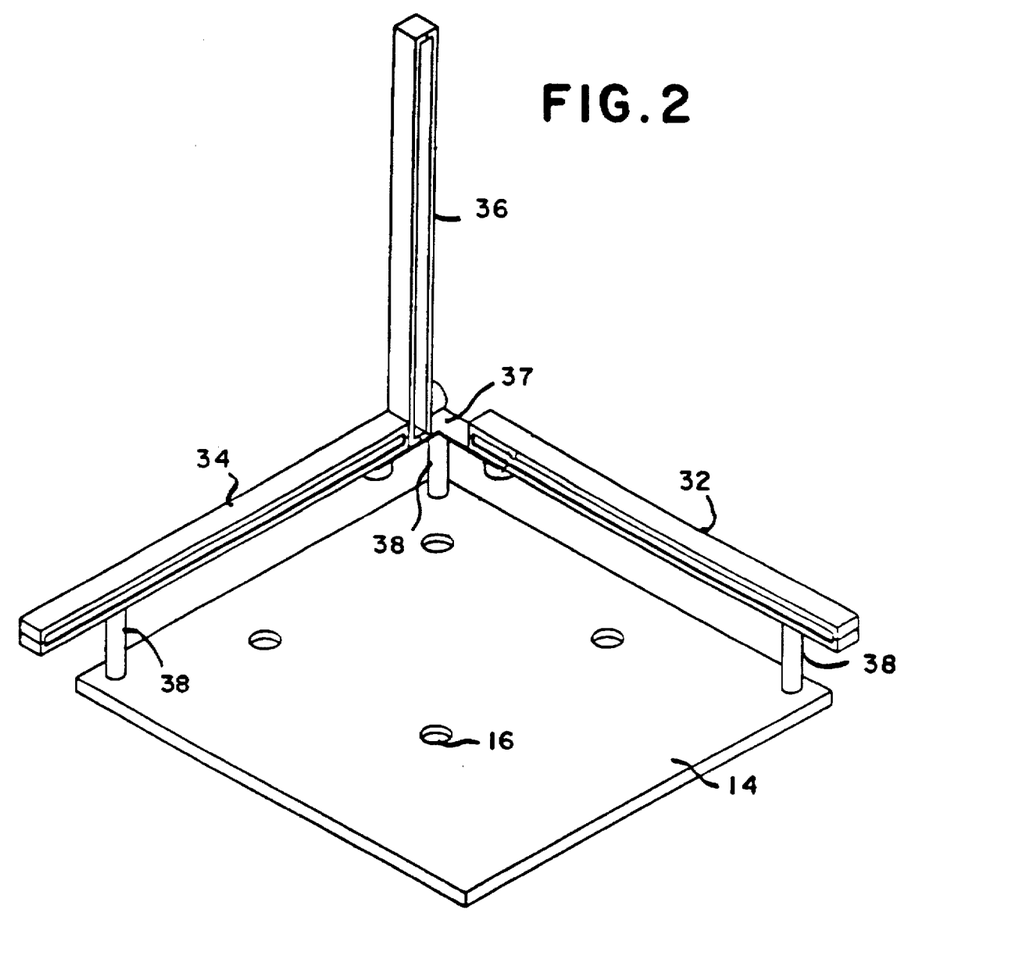
FIG. 2 is a view similar to FIG. 1, drawn to an enlarged scale, showing the dimensional weighing apparatus without the support, and with the scale and carton removed to reveal certain details.
Figure 3:
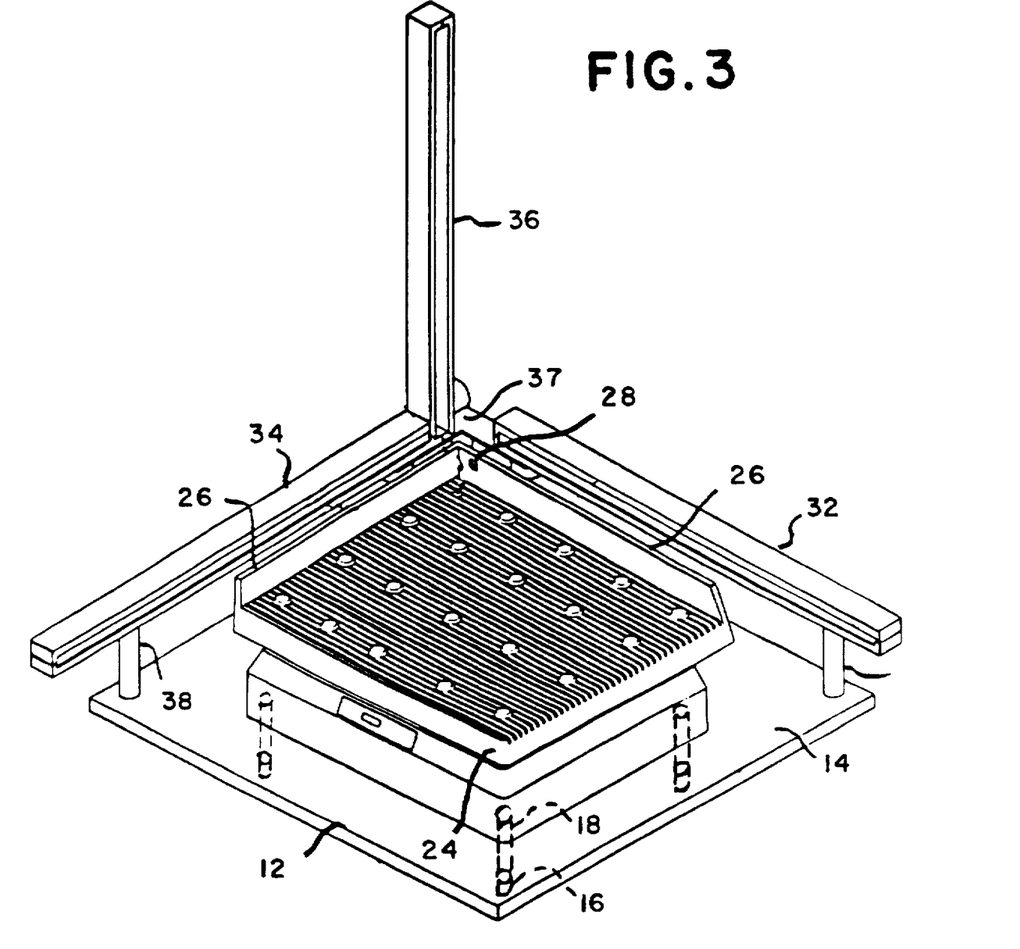
FIG. 3 is a view similar to FIG. 2, showing the dimensional weighing apparatus with the weighing scale in place.

The weighing scale 20 includes a base unit 22 which houses all of the mechanical and electronic components of the scale 20 which are well known in the digital weighing art and need not be further described or shown herein for a full understanding of the present invention. The scale also includes a platform 24 which provides a surface on which cartons to be weighed are placed. The platform 24 is provided with a pair of upstanding flanges 26 which constitute guides for ensuring that a carton is placed on the platform 24 in a precise predetermined location. As best seen in FIGS. 2 and 3, the adjacent ends of the upstanding flanges 26 form a reference point 28 for a lower rear corner of a carton placed on the platform 24, thereby establishing the aforementioned predetermined location, the significance of which will be made clear hereinbelow.

The dimensional weighing apparatus 10 further includes a linear measuring frame, indicated generally by the reference numeral 30, which is a component of the carton measuring apparatus yet to be described. The measuring frame 30 includes three elongate measuring arms 32, 34 and 36, two of which, (32 and 34) are oriented in a horizontal plane and disposed perpendicular to each other so as to extend along the two horizontal axes of a carton, the third (36) being vertically oriented to extend along the third axis of the carton, thereby disposing the measuring arms 32, 34 and 36 so that they are in spaced parallel relationship with the adjacent surfaces of the carton that represent the length, width and height of a carton disposed on the platform 24. The horizontally oriented measuring arms 32 and 34 rest on a suitable base member 37 which is supported on the base 14 by a plurality of suitable posts 38 which are also secured to the base 14 so that, as seen in FIG. 3, the measuring arms 32 and 34 maintain a fixed spatial and parallel relationship with the upstanding flanges 26 of the scale platform 24. The vertically oriented measuring arm 36 also rests on the base member 37 adjacent the inner ends of the horizontal measuring arms 32 and 34. Although the preferred embodiment is shown as above described, it is possible, within the scope of the invention, to mount the L-shaped base member 37 and the measuring arms 32, 34 and 36 directly on the scale platform 24, in which case the weight of these parts becomes part of the tare weight of the scale. It will also be seen that each of the measuring arms 32, 34 and 36 includes a linear scale 39 with numbers representing a unit of linear measurement, for example, an inch.

Figure 4:
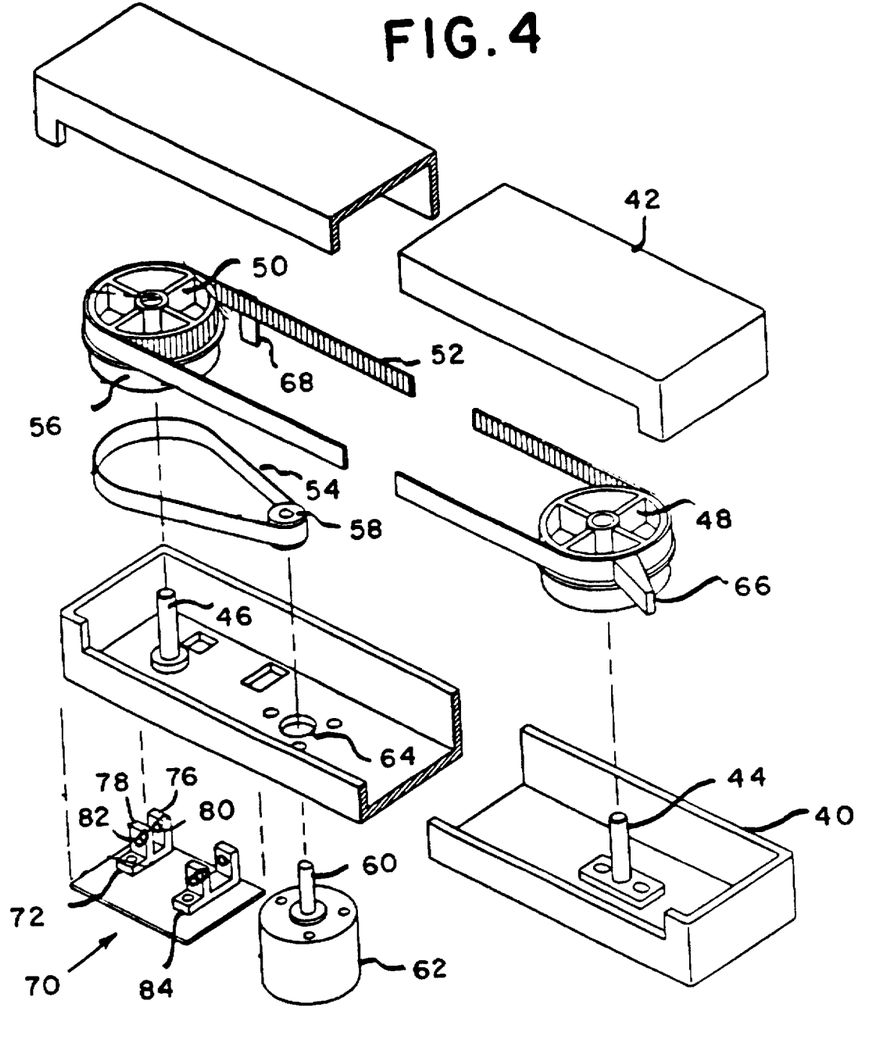
FIG. 4 is an exploded view of the operating parts of the carton measuring apparatus.
Figure 5:
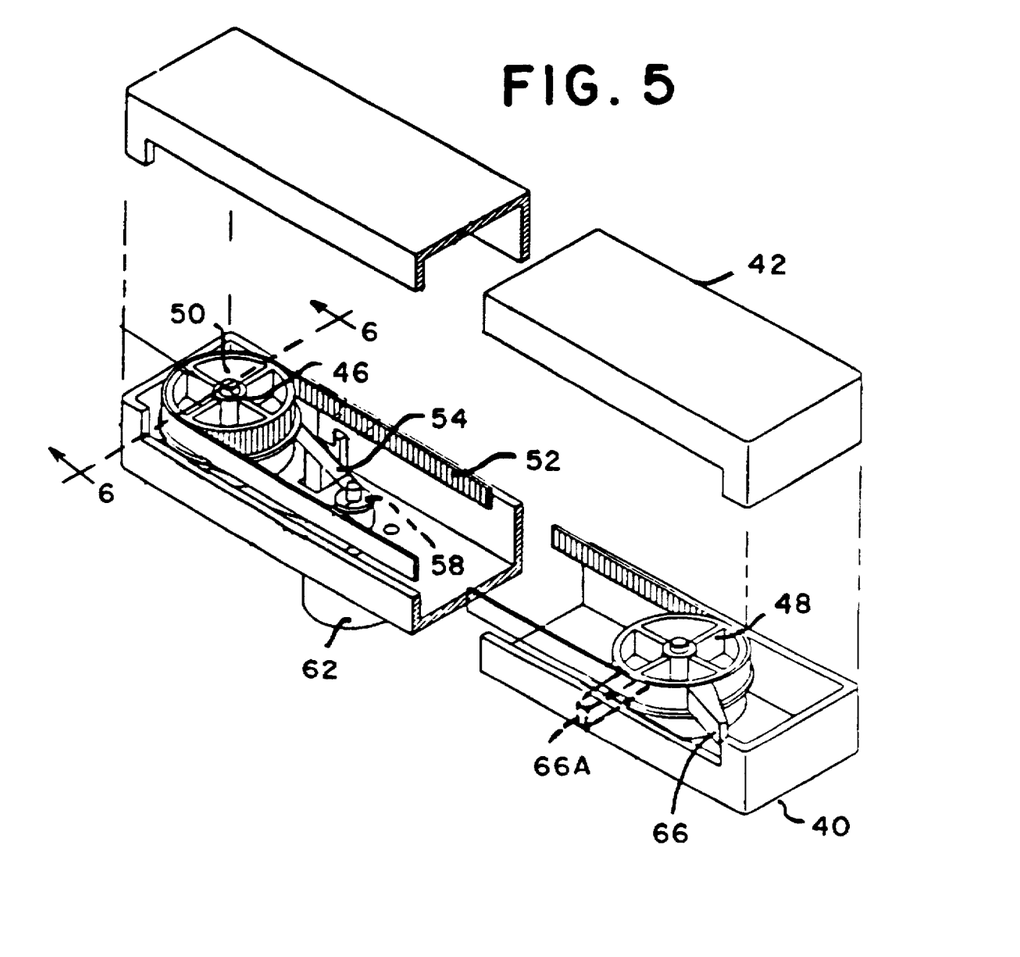
FIG. 5 is a perspective view of the measuring apparatus shown in FIG. 4 with only the top cover of the measuring arm removed.

There is a means operatively associated with the measuring frame 30 for measuring the linear distance of the length, width and height of a carton disposed on the platform 24. Referring particularly to FIGS. 4 and 5, this means comprises a movable carton contact member device mounted in each of the measuring arms 32, 34 and 36 for measuring each of the carton dimensions associated with the measuring arms. Since the contact member device is identical for each of the measuring arms, only one is illustrated in FIGS. 4 and 5, as indicated for the measuring arm 32, it being understood that the same structure is mounted in the measuring arms 34 and 36. Again, the preferred embodiment is shown as described above, but if the measuring arms 32, 34 and 36 are mounted directly on the scale platform, the upstanding flanges 26 can be eliminated since the measuring arms themselves would perform the function of the upstanding flanges.

Thus, the measuring arm 32 comprises a base portion 40 supported by the posts 38 in the manner described above, and a cover portion 42 for enclosing the mechanical parts now to be described. The base portion 40 supports a pair of upstanding posts 44 and 46 adjacent opposite ends of the base portion 40, the post 44 supporting an idler pulley 48 for rotation thereon. The post 46 supports a drive pulley 50 for rotation thereon, the pulleys 48 and 50 being connected by a suitable chain or belt, such as the timing belt 52, so that the pulleys 48 and 50 rotate in unison. The drive pulley 50 is rotated by another belt 54 which passes around a lower portion 56 of the drive pulley 50, the belt 54 also passing around a smaller pulley 58 which is fixedly connected to the drive shaft 60 of a reversible DC electric motor 62 which is suitably connected to the lower surface of the base portion 40, or is otherwise suitably supported, so that the drive shaft 60 extends through the aperture 64 formed in the base portion 40. It will thus be apparent that as the drive shaft 60 of the motor 62 is rotated in opposite directions, the timing belt 52 is driven in correspondingly opposite directions.

A suitable contact member 66 is formed integrally with or is suitably attached to the outer surface of the timing belt 52 to move therewith, the contact member 66 being sufficiently long that it will contact the surface of a carton placed in proper position on the scale platform 24, as best seen in FIG. 1. In addition, a suitable flag or other light obstructing element 68 is also formed integrally with or suitably attached to the timing belt 52 adjacent the inner end of the rearward run and projects downwardly therefrom for a purpose hereinafter described.

Figure 6:
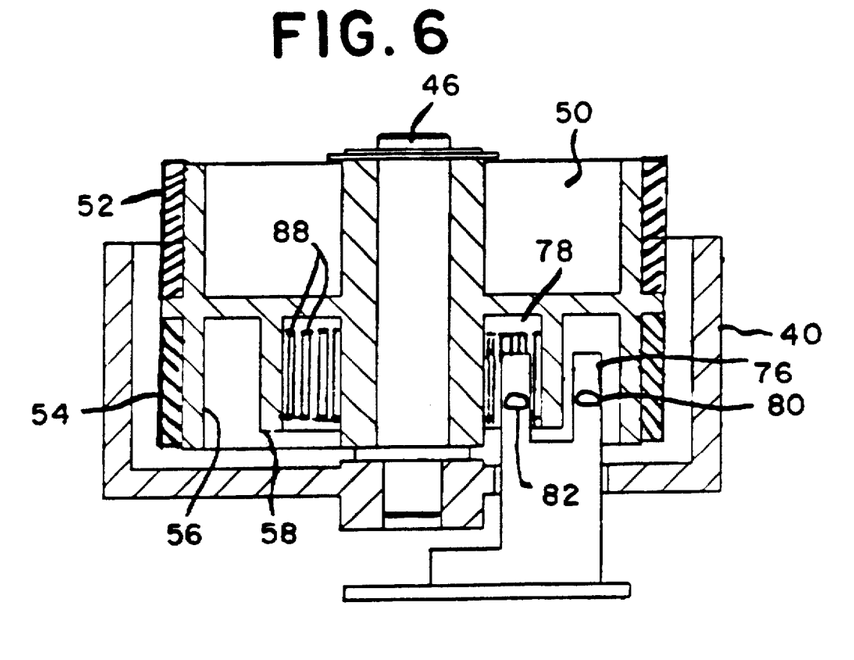
FIG. 6 is a sectional view taken on the line 6—6 of FIG. 5 showing the optical encoder component of the measuring apparatus.

As best seen in FIGS. 4 and 6, an optical encoder assembly designated generally by the reference numeral 70 is also mounted in any convenient manner to the underside of the base portion 40. The optical encoder assembly 70 includes an encoder sensor 72 mounted on a printed circuit board 74 which forms part of the electronic control system for the apparatus 10 and which is further described below. The encoder sensor 72 includes a pair of upstanding, spaced apart supports 76 and 78 for housing a source of light 80, such as an LED, and a photocell 82 respectively. The encoder assembly 70 includes a start count sensor 84 which is slightly longitudinally offset from the encoder sensor 72 but is otherwise identical thereto.

As best seen in FIG. 6, a slotted rotor 86 is either formed integrally with or suitably attached to the pulley 50 for rotation therewith, the rotor 86 being shown as formed integrally with the pulley 50 in FIG. 5. The rotor 86 includes a plurality of evenly spaced vertically oriented slots 88 which define increments of rotary moving of the rotor 86 in response to rotation of the pulley 50. It will be seen that when the parts are assembled together as in FIG. 5, the rotor 86 is disposed between the upstanding supports 76 and 78, between the light source 80 and the photocell 82, with the result that as the pulley 50 and the rotor 86 rotate, the slots 88 pass by the light source 80 and photocell 82 and thereby alternately permitting and preventing light from the source 80 to energize the photocell 82.

Referring back to FIG. 4, the flag 68 which extends downwardly from the belt 52 is adapted to be positioned between the upstanding supports of the emitter/sensor unit 84 when the timing belt is in a home position, as further explained below, and which moves away from the emitter/sensor unit 84 when the belt 52 begins to move.

Figure 7:
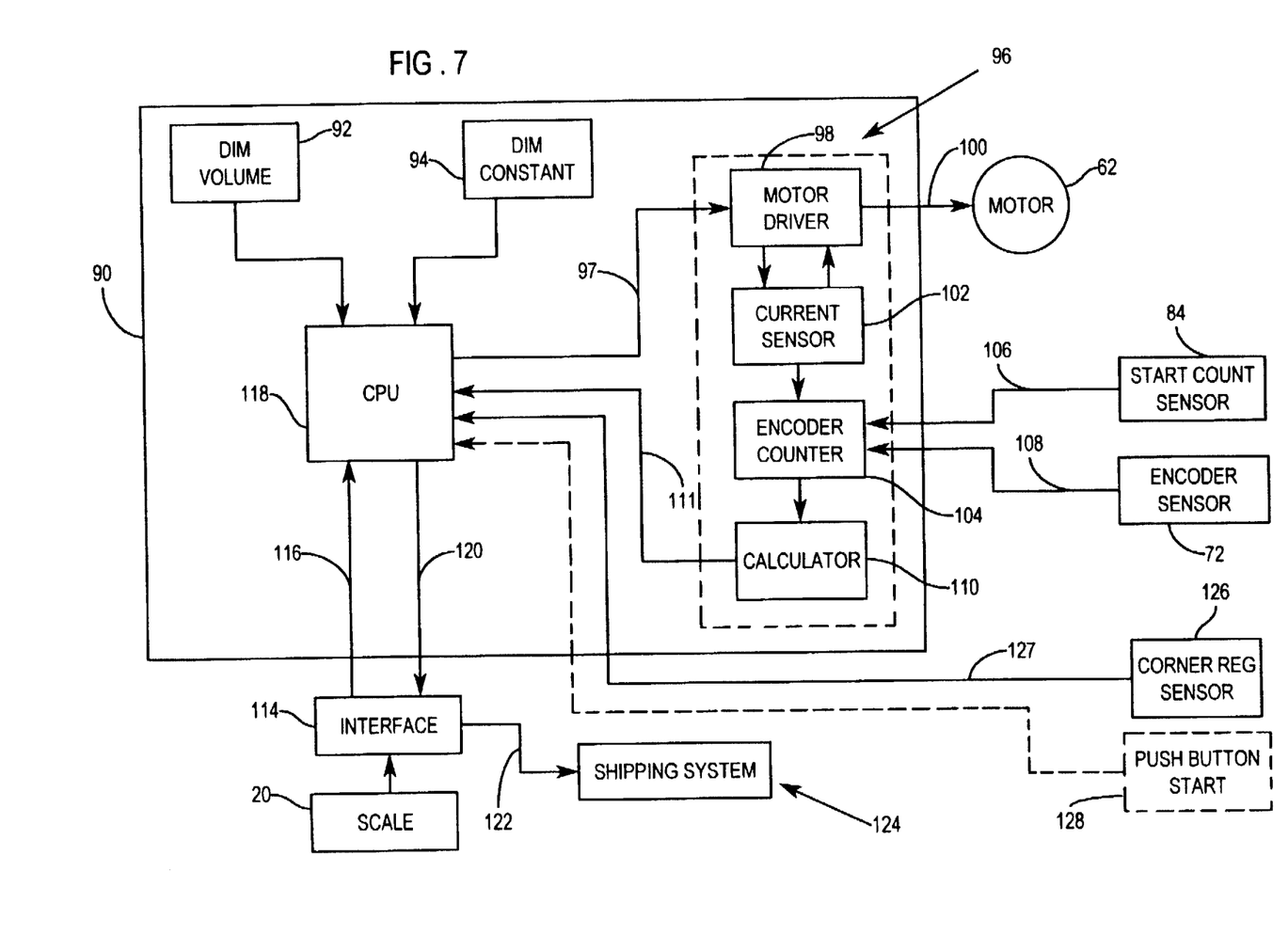
FIG. 7 is a schematic diagram of the major components of the electronic control system for the dimensional weighing apparatus of the present invention.

FIG. 7 illustrates schematically the major components of an electronic control system for controlling the operation of the previously described apparatus and for determining a shipping weight for a carton disposed on the scale based on converting the actual or dimensional weight, as the case may be, of a carton into a shipping weight which is transferred to a shipping system which converts that weight into a realistic shipping charge. It should be understood that the specific components described and shown herein are illustrative of the type of components required to perform the functions which are carried out by the apparatus of the present invention, and that other specific components may be utilized to achieve these functions.

The electronic control system includes a computer processing means 90 having a suitable processor unit which controls the operation of the apparatus 10 for determining the linear dimensions of a carton on the platform 24, calculating the volume thereof, comparing that volume with a predetermined threshold volume, calculating a dimensional weight for the carton and determining a shipping weight based on whether the dimensional weight is greater or less than the actual weight as determined by the scale 20.

Thus, the computer processing means 90 includes a first settable memory storage device 92 which stores a predetermined threshold volume that represents the volume of a carton, typically in the order of one cubic foot regardless of actual dimensions, below which the shipping weight would be calculated on the basis of the actual weight of the carton, and above which the shipping weight would be calculated on the basis of the dimensional weight of the carton. The computer processing means 90 also a includes a second settable memory storage device 94 which stores a variable dimensional weight constant, the amount of which can depend on the preference of a particular carrier, and which is used for converting the actual volume of a carton into a calculated dimensional weight. For the purpose of this determination, dimensional weight is defined as the cubic volume per unit of weight, the actual amounts depending on whether measurements are made using the English or metric measuring systems; for example, the constants generally adopted in the United States for the dimensional weight of cartons for shipping weight purposes is 194 cubic inches per pound for domestic service and 166 cubic inches per pound for international service. Thus, once the actual volume of a carton is determined, that volume is divided by 194 or 166 respectively to determine the dimensional weight of the carton in pounds. The conversion of this dimensional weight into a shipping charge is further explained below.

The computer processing means 90 also includes a control component, indicated generally by the reference numeral 96 and shown enclosed within a dotted line box within the solid line box representing the computer. It should be understood that the control component 96 is applicable to only one measuring 32, 34 or 36, and that the computer processing means 90 actually includes three such control components 96, one for each measuring arm 32, 34 and 36, but that only one is shown and described since they would be identical. Thus, each control components 96 includes a motor driver 98 which controls the operation of the motor 62 through the line 100 in both forward and reverse directions. A current sensor circuit 102 is connected to the motor driver 98 to sense the current level from the motor driver 98 to the motor 62 for the purpose of causing the motor driver 98 to reverse the direction of rotation of the motor 62 in response to a rise in the current level when a paddle 66 strikes the edge of a carton C on the scale platform 24, as further explained below.

The current sensor circuit 102 is also connected to an encoder counter 104 to signal the encoder counter 104 to stop counting pulses when a paddle has contacted an edge of a carton. The above described encoder sensor 72 and start count sensor 84 are also connected to the encoder counter 104 through lines 106 and 108 respectively, so that the encoder counter 104 can count the pulses from the encoder sensor 72 after it receives a count signal from the start count sensor 84, also as further described below. The encoder counter 104 is connected to a linear third memory storage and calculator device 110 which converts the pulse counts from the encoder counter 104 into linear dimensions and stores this data.

The weighing scale 20 is connected through a line 112 to an interface component 114, which in turn is connected through a line 116 to an arithmetic logic unit (CPU) 118 which is part of the computer processing means 90. The first memory storage device 92 and the third memory storage device 110 are also connected within the computer processing means 90 to the CPU 118 so as to transmit the predetermined threshold volume and the linear dimension data from these memory storage devices respectively to the CPU 118. The CPU 118 has the capability of calculating the volume of the carton from the linear dimensions stored in the third memory storage device 110, and then comparing that volume with the predetermined threshold volume from the first memory storage device 92 to determine whether the actual volume is above or below the predetermined threshold volume. The CPU 118 also has the capability of determining the dimensional weight of the carton by dividing the calculated volume by the dimensional constant stored in the second memory device 94, and then comparing the dimensional weight with the actual weight of the carton, as determined by the scale 20, to determine which of the two weights is the larger, which would be the shipping weight for that carton.

The CPU 118 has the further capability of sending a signal indicative of that weight via a line 120 to the interface 114 and from there via a line 122 to a shipping system, designated generally by the reference numeral 124. The shipping system 124 is typically a rather complex processing system which forms no part of the present invention and therefore need not be described other than to mention that it would include a computer processing unit that would store individual carrier rates for different amounts of weight, carrier classes, destination zip codes, and other relevant information, and would respond to the incoming signal that is indicative of the shipping weight by calculating an appropriate shipping charge for the carton. It should be noted that the computer processing means 90 and all of the components contained therein could be physically located in the shipping system 124 rather than with the dimensional weighing apparatus 10. It is only necessary for complete implementation of the present invention that the computer processing means 90 be interconnected between the measuring frame 30 and the associated measuring means, on the one hand, and the shipping system 124 on the other, with the physical location of the computer processing means 90 being a matter of choice.

The operation of the apparatus thus far described is as follows: During a set up phase of the dimensional weighing apparatus 10, the computer processing means 90 is set so as to place a minimum or threshold volume into the first memory storage device 92. For the purpose of illustration in the following description of operation, this volume will be considered to be 1728 cubic inches, or one cubic foot. It should be understood that this volume does not necessarily literally mean a cubic foot, i.e., a carton that is 12"×12" by 12", but rather any combination of length, width and height that, when multiplied together, equals 1728 cubic inches.

During operation, a carton C (FIG. 1) is placed on the scale platform 24 with the rear and side edges respectively of the carton C flush against the upstanding guide rails 26, thereby positioning the carton C in the proper predetermined location for both weighing by the scale 20 and measuring by the measuring arms 32, 34 and 36 in conjunction with the optical measuring means described above. The actual weight of the carton is determined by the scale 20, which for the purpose of this illustration, is assumed to be 10 pounds, and this weight is transferred to the CPU 118 as above described. As soon as the carton is properly positioned on the scale platform, a corner registration sensor 126, the actual location of which is shown in FIG. 3, sends a signal via the line 127 to the CPU 118 indicating that the carton C is in the proper position for weighing, and dimensional weighing if necessary, and the CPU then commences a cycle of operation as described below. Alternatively, the corner registration sensor 126 can be replaced by a manual push button 128, or other suitable manual control, which may be conveniently located as desired, so that the dimensional weighing apparatus 10 does not commence operation until the operator pushes the button 128.

Regardless of the manner in which the CPU 118 is activated, it sends a signal via the line 97 to the motor driver 98 via the line 130 which causes the motor driver 98 to energize the motor 62 to drive the pulley 50 and belt 52 in a direction that will move the paddle 66 from a storage or home position within the housing 40, as illustrated in FIG. 5, out from within the housing 40 to approximately the position indicated as 66A. This is the position at which the encoder counter 104 commences counting pulses from the encoder sensor 72, and is determined by the flag 68 moving out of the start count sensor 84 which permits a photosensor to sense light from an emitter in the same manner as described below. At this point, the encoder counter 104 starts counting pulses from the encoder sensor 72 which are generated by the slots 88 on the rotor 86 passing between the emitter 80 and photocell 82.

When the paddle 66 reaches an edge of the carton C, which is hereinafter designated a stop position, it is abruptly stopped, which stalls the motor and results in a sudden increase in the motor current. This condition is sensed by the current sensor 102, which sends a signal to the motor driver to reverse the direction of operation of the motor 62 to cause the pulley 50 and the belt 52 to move in the opposite direction to move the paddle 66 back to the home position within the housing 40. Simultaneously, the current sensor 102 signals the encoder counter 102 to stop counting pulses from the encoder sensor 72, which then sends a signal to the memory storage unit 110 which is indicative of the number of pulses counted, from which the memory storage unit 110 converts the number of pulses counted to a linear dimension which is then stored in memory. It should be understood that this process is subtractive rather than addative, in the sense that the dimension of the carton is determined by subtracting the number of pulses counted during movement of the paddle 66 from the start count position 66A to the stop position from the total number of pulses that represent the full distance from the start count position 66A to the zero reference point at the juncture of the three measuring arms 32, 24 and 36.

There is the possibility that an operator may place a carton on the scale platform in a manner in which it is skewed with respect to either of the measuring arms 32 or 34 so much that the paddle 66 associated with either or both of these arms misses the side of the carton it should contact and continues to travel beyond the point at which it should be stopped by the carton. To accommodate this situation, it is desirable to have appropriate logic circuitry in the computer processing means 90 or in the shipping system 124 which provides the operator with a suitable indication that the measurements taken by any of the measuring arms 32, 34 or 36 are less than predetermined minimum measurements stored in a memory. Upon being so advised, the operator should check to ensure that the carton is properly placed on the scale platform 24, or to verify that the carton being measured is in fact smaller than the predetermined minimum measurements.

It should again be remembered that the foregoing structure from the motor driver 98 to the third memory storage unit 110, including the motor 62 and the mechanical parts operated thereby and the start count and encoder sensors, are all duplicated for each of the measuring arms 32, 34 and 36, and the CPU is capable of distinguishing, by suitable means well known in the art from which measuring arm 32, 34 or 36 the pulses are being counted during movement of the appropriate padded 66.

Again, for the purpose of illustration, it is assumed that the carton C actually measures 12 inches along the measuring arm 32, 14 inches along the measuring arm 34 and 8 inches along the measuring arm 36. The CPU 118 then performs three functions. It receives the linear dimensions from the memory storage unit 110 via the line 111 and calculates the actual volume of the carton. In the illustration given, this would equal 1344 cubic inches. The CPU then compares this volume against the threshold volume stored in the memory storage unit 92, and determines that it is considerably less than the threshold volume of 1728 cubic inches, which means that the shipping weight for the carton will be the same as the actual weight as determined by the scale 20, i.e., 10 pounds, and that the actual weight will be the shipping weight sent to the shipping system 124. The CPU 118 then sends a signal to the shipping system 124 which is indicative of the actual weight of the carton so that the shipping system 124 can assess the appropriate shipping charge. In addition, the shipping system 124 prints out a manifest of the charges for all cartons dimensionally measured during a predetermined period of time, and also possibly prints individual address labels for each carton, typically with bar coded information thereon.

If, on the other hand, a carton C is placed on the scale platform 24 which still weighs only 10 pounds, but the linear dimensions of this carton are, for example, 15 inches on the measuring arm 32, 23 inches on the measuring arm 34 and 12 inches on the measuring arm 36, the same procedure as described above would occur to determine the linear dimensions of the carton, except that the calculated volume of the carton would now be 4140 cubic inches, far in excess of the threshold volume of 1728 cubic inches. The CPU 118 then determines the dimensional weight of the carton, by dividing the calculated volume by the dimensional constant stored in the memory storage unit 94, which in the example is assumed to be the domestic shipping standard of 194 cubic inches per pound. The CPU 118 divides the calculated volume of 4140 cubic inches by 194, which equals 23.34 pounds, and then compares this weight to the actual weight of the carton as determined by the scale 20 to determine which weight is the larger. In the example given, since the dimensional weight of 23.34 pounds is the larger, the CPU 118 sends a signal indicative of this weight via to the line 120 to the interface 114 and the line 122 to the shipping system 124, which then determines the shipping charge for 23.34 pounds in the same manner as it did for the smaller carton for which the actual weight was 10 pounds.

If, on the other hand, the actual weight of this carton had been 25 pounds, which is relatively close to the 23.34 pounds for the dimensional weight of the carton, the CPU 118 would continue the process described above for calculating the dimensional weight of the carton in the manner described above, in which case the comparator 74 would determine that the actual weight of 25 pounds is the larger, and would then send this weight to the shipping system 124 for determination of the appropriate shipping charge.

It is to be understood that the present invention is not to be considered as limited to the specific embodiment described above and shown in the accompanying drawings, which is merely illustrative of the best mode presently contemplated for carrying out the invention and which is susceptible to such changes as may be obvious to one skilled in the art, but rather that the invention is intended to cover all such variations, modifications and equivalents thereof as may be deemed to be within the scope of the claims appended hereto.

We claim:

1. Dimensional weighing apparatus adapted for use with a shipping system which determines an appropriate shipping charge for packages and parcels based, among other factors, on an appropriate shipping weight as determined by said dimensional weighing apparatus, said dimensional weighing apparatus comprising:

(a) means defining a supporting surface;
 (b) a weighing scale mounted on said supporting surface and having:
   (i) a platform on which cartons are placed for determining the actual weight of the cartons; and,
   (ii) means defining a reference point for cartons disposed on said platform for positioning cartons in a predetermined location on said platform relative to said measuring frame such that the surfaces of the cartons adjacent the measuring frame are disposed in spaced relationship therewith; and, wherein said means defining said reference point comprises guide means mounted on said platform in spaced parallel relationship with said measuring arms for ensuring that said surfaces of cartons disposed on said platform in said predetermined location are disposed in evenly spaced parallel relationship with said measuring arms;
 (c) a measuring frame operatively associated with said supporting surface; wherein said measuring frame includes a plurality of elongate measuring arms extending from a juncture of said measuring arms disposed adjacent said reference point along the two horizontal axes of cartons and the vertical axis thereof, said juncture of said measuring arms being disposed in closely spaced relationship with said reference point; and, wherein said measuring means comprises:
   (i) a carton contact member movably mounted on each of said measuring arms for movement therealong for determining the extent to which each of said adjacent surfaces of a carton disposed on said platform in said predetermined location extends along the adjacent measuring arm, wherein said measuring means further comprises:
   (ii) means for moving said carton contact members along said measuring arms between a home position adjacent the outer free ends of said measuring arms and a stop position as determined by the point of contact of said contact members with the surface of a carton adjacent said measuring arms; and (iii) means for determining the extent of movement of said contact members between said home positions and said stop positions;

(d) movable means operatively associated with said measuring frame for contacting adjacent surfaces of a carton placed on said platform for measuring the linear distance of the length, width and height of said carton; and (e) computer processing means responsive to operation of said weighing scale and said measuring means for determining a shipping weight of said carton by calculating the dimensional weight thereof and comparing said dimensional weight with said actual weight to determine which of said weights is the larger, whereby said dimensional weighing apparatus determines the appropriate shipping weight on which the shipping system determines an appropriate shipping charge.

2. Dimensional weighing apparatus as set forth in claim 1 wherein said means for moving said carton contact members along said measuring arms comprises:

(a) means for supporting said carton contact member for movement along substantially the entire length of each of said measuring arms;

(b) means for driving said supporting means in a direction to move said carton contact member from said home position toward the opposite end of said measuring arm; and (c) means for sensing when said carton contact member contacts the surface of a carton at said stop position and for reversing the direction of movement of said supporting means to move said carton contact member from said stop position back to said home position.

3. Dimensional weighing apparatus as set forth in claim 1, wherein said means for determining the extent of movement of said contact members comprises:

(a) an optical sensor associated with each of said measuring arms and responsive to movement of said carton contact member for said arm for generating successive pulses indicative of increments of movement of said contact member; and (b) pulse counting means responsive to said optical sensor for counting said successive pulses during movement of said contact member.

4. Dimensional weighing apparatus as set forth in claim 1, wherein said computer processing means for determining the shipping weight of said carton disposed on said platform comprises means for determining whether or not the actual volume of the carton exceeds a predetermined threshold volume below which said processing means determines a shipping weight based on said actual weight of the carton as determined by said weighing scale, and at or above which said processing means calculates a shipping weight based on the volume of the carton independent of the weight thereof as determined by said weighing scale.

5. Dimensional weighing apparatus as set forth in claim 4, wherein said means for determining whether or not the volume of the carton exceeds a predetermined threshold volume comprises:

(a) memory storage means for storing said predetermined threshold volume;

(b) memory storage means for storing the individual linear dimensions of the length, width and height of a carton disposed on said platform;

(c) means for calculating the volume of the carton based on said linear dimensions; and (d) means for comparing the calculated volume of the carton with the predetermined threshold volume to determine which is the larger.

6. Dimensional weighing apparatus as set forth in claim 5, wherein said processing means for determining the shipping weight of said carton disposed on said platform further comprises means for converting the actual volume of the carton into a dimensional weight thereof and for comparing the dimensional weight with the actual weight to determine which is the larger.

7. Dimensional weighing apparatus as set forth in claim 6, wherein said means for converting the actual volume of a carton into dimensional weight thereof and for comparing the dimensional weight with the actual weight comprises:

(a) memory storage means for storing a dimensional weight constant in terms of cubic units per unit of weight;

(b) means for calculating a dimensional weight by dividing the actual volume of the carton by said dimensional weight constant, and (c) means for comparing said actual weight of the carton with said dimensional weight thereof to determine larger.

* * * * *